USO08880635B1

(12) United States Patent
Singh et al.

(10) Patent No.: US 8,880,635 B1
(45) Date of Patent: Nov. 4, 2014

(54) SELECTIVE REQUESTING OF CACHED RESOURCES

(75) Inventors: Anantica Jija Hari Singh, San Francisco, CA (US); Ziga Mahkovec, San Francisco, CA (US); Sashanka Vishnuvajhala, San Jose, CA (US); Othar Hansson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 192 days.

(21) Appl. No.: 13/563,608

(22) Filed: Jul. 31, 2012

(51) Int. Cl.
*G06F 15/16* (2006.01)

(52) U.S. Cl.
USPC ............................. 709/213; 709/218; 709/219

(58) Field of Classification Search
CPC ................... G06F 17/30902; G06F 17/30554; G06F 17/30864
USPC .................. 709/213, 201, 203–205, 217–219
See application file for complete search history.

(56) References Cited

U.S. PATENT DOCUMENTS

| 6,134,680 | A | 10/2000 | Yeomans |
| 7,231,494 | B1 | 6/2007 | Cox et al. |
| 7,284,160 | B2 | 10/2007 | Skog et al. |
| 2003/0023664 | A1 | 1/2003 | Elmer |
| 2004/0044731 | A1* | 3/2004 | Chen et al. ..................... 709/203 |
| 2004/0044740 | A1* | 3/2004 | Cudd et al. ..................... 709/217 |
| 2005/0102279 | A1* | 5/2005 | Watanabe ......................... 707/3 |
| 2007/0088805 | A1* | 4/2007 | Cyster ............................ 709/217 |
| 2007/0288589 | A1* | 12/2007 | Chen et al. ..................... 709/217 |
| 2011/0238662 | A1* | 9/2011 | Shuster et al. ................. 707/728 |

* cited by examiner

*Primary Examiner* — Ruolei Zong
(74) *Attorney, Agent, or Firm* — Fish & Richardson P.C.

(57) ABSTRACT

Methods, systems, and apparatus for selectively requesting cached versions of resources. In one aspect, a method includes transmitting, by a user device, a resource request for a resource hosted by a first server; determining whether the first server provided response data; in response to determining that the first server provided response data: determining whether a cache request condition has occurred; in response to determining that a cache request condition has occurred: transmitting a request for a cached version of the resource to a cache server; and receiving cache data that causes the user device to display the cached version of the resource; and in response to determining that the first server did not provide response data: transmitting a request for a cached version of the resource to the cache server; and receiving cache data that causes the user device to display the cached version of the resource.

20 Claims, 6 Drawing Sheets

SELECTIVE REQUESTING OF CACHED RESOURCES

BACKGROUND

This specification relates to selectively requesting cached resources.

The Internet enables access to a wide variety of resources, such as video or audio files, images, and web pages for particular subjects. Each resource has a corresponding resource address that is used to locate the resource on the Internet. Resources may be hosted on a server that is connected to the Internet, and each resource may also be associated with a domain. When a user directs a user device to request a resource, often using a web browser or other application on the user device, the user device sends a resource request to the server identified by the resource address. Upon receipt of the resource request, the server attempts to locate the requested resource and provide it to the requesting user device.

Often, however, the server is unable to locate or provide the requested resource for any number of reasons. In these situations, the user will not be provided with the requested resource, and is often presented with an error page. Error pages are often vague and unhelpful to the user, generally only listing a standard error status code. However, a publisher of the resource (or the publisher of the domain associated with the resource) may provide a customized error page with helpful information. For example, a publisher may decide to remove a resource or section of a website, and may provide information indicating that the resources are no longer available in response to the requests for the resources that have been removed. In other situations, the resource request may never be received by the server, in which case the publisher will not be able to provide the user device with the requested resource or a customized error page. As a result, a user is often presented with vague and unhelpful error pages, or receives no content, when requesting a resource that is unavailable.

SUMMARY

This specification describes technologies relating to the selective requesting of cached resources.

In general, one innovative aspect of the subject matter described in this specification can be embodied in methods that include the actions of transmitting, by a user device, a resource request for a resource hosted by a first server at a first domain; determining, by the user device, whether the first server at the first domain provided response data in response to the resource request; in response to determining that the first server provided response data: determining, based on the response data, whether a cache request condition has occurred; in response to determining that a cache request condition has occurred: transmitting, by the user device, a request for a cached version of the resource to a cache server at a second domain that is different from the first domain; and receiving cache data that causes the user device to display the cached version of the resource; and in response to determining that the first server did not provide response data: transmitting, by the user device, a request for a cached version of the resource to the cache server at the second domain; and receiving cache data that causes the user device to display the cached version of the resource. Other embodiments of this aspect include corresponding systems, apparatus, and computer programs, configured to perform the actions of the methods, encoded on computer storage devices.

These and other embodiments can each optionally include one or more of the following features. The method may, in response to determining that a cache request condition has not occurred, display data specified by the response data. The method may also include determining, by the user device, that the requested resource is available; and displaying an availability indicator on the user device, the availability indicator specifying that the requested resource is available and specifying a link to the requested resource at the first domain.

In some implementations, determining whether the first server provided response data may comprise determining that the first server did not provide response data in response to an amount of time greater than a timeout threshold having elapsed after transmission of the resource request. Determining whether the first server provided response data may comprise determining that the first server did not provide response data in response to determining, by the user device, that the user device was unable to connect to the first server.

In some implementations, determining whether a cache request condition occurred may comprise determining that the cache request condition occurred in response to determining that the response data comprises a standard http status code indicating that the first server is not providing the requested resource. Determining whether a cache request condition occurred may comprise determining that the requested resource is a resource that is unavailable to a plurality of user devices.

In some implementations, the cache data may cause the user device to display a cache indicator with the cached version of the resource, the cache indicator specifying that the cached version of the resource is being displayed and specifying a link to the requested resource at the first domain.

Particular embodiments of the subject matter described in this specification can be implemented so as to realize one or more of the following advantages. User devices may selectively request a cached version of an unavailable resource without requiring user input and in a manner that respects publishers' design choices. If a publisher has a customized responsive resource that may be helpful or informative to users who attempt to obtain unavailable resources at that publisher's domain, a user device may display the customized resource as opposed to requesting a cached version, enhancing the user's experience while respecting the publisher's design change. Conversely, if a user device is unable to connect to a server to obtain a resource requested by the user, or if the user device receives an uninformative or unhelpful resource in place of the requested resource, the user device may request and display a cached version of the requested resource, also enhancing the user's experience. In addition, publishers will benefit by having cached versions of their resources available to users, even if the publisher's website is currently unavailable.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Resources, such as web pages hosted by web sites, may occasionally be unavailable for any number of reasons. The systems and methods disclosed herein cause a user device to selectively request a cached version of an unavailable resource.

A user device requests a resource that is hosted by a server computer at a first domain, and detects that the requested resource has not been provided (e.g., a timeout, a 404 error, 500 error, etc.). The device then determines whether the server provided a response (e.g., an error web page, a redirect web page, etc.) to the resource request.

If the requested resource has not been provided and the server provided a response, the device determines whether one or more cache request conditions have occurred. For example, the cache request condition may be that the response is a standard 404 error page. If the condition has occurred, the device then requests a cached version of the resource from a cache server at a second domain. If the condition has not occurred, the device displays the content provided by the server at the first domain.

In addition, if the server at the first domain did not provide a response to the resource request, the device requests a cached version of the resource from a cache server at a second domain. Example implementations are described in more detail in the sections that follow.

Figure 1:
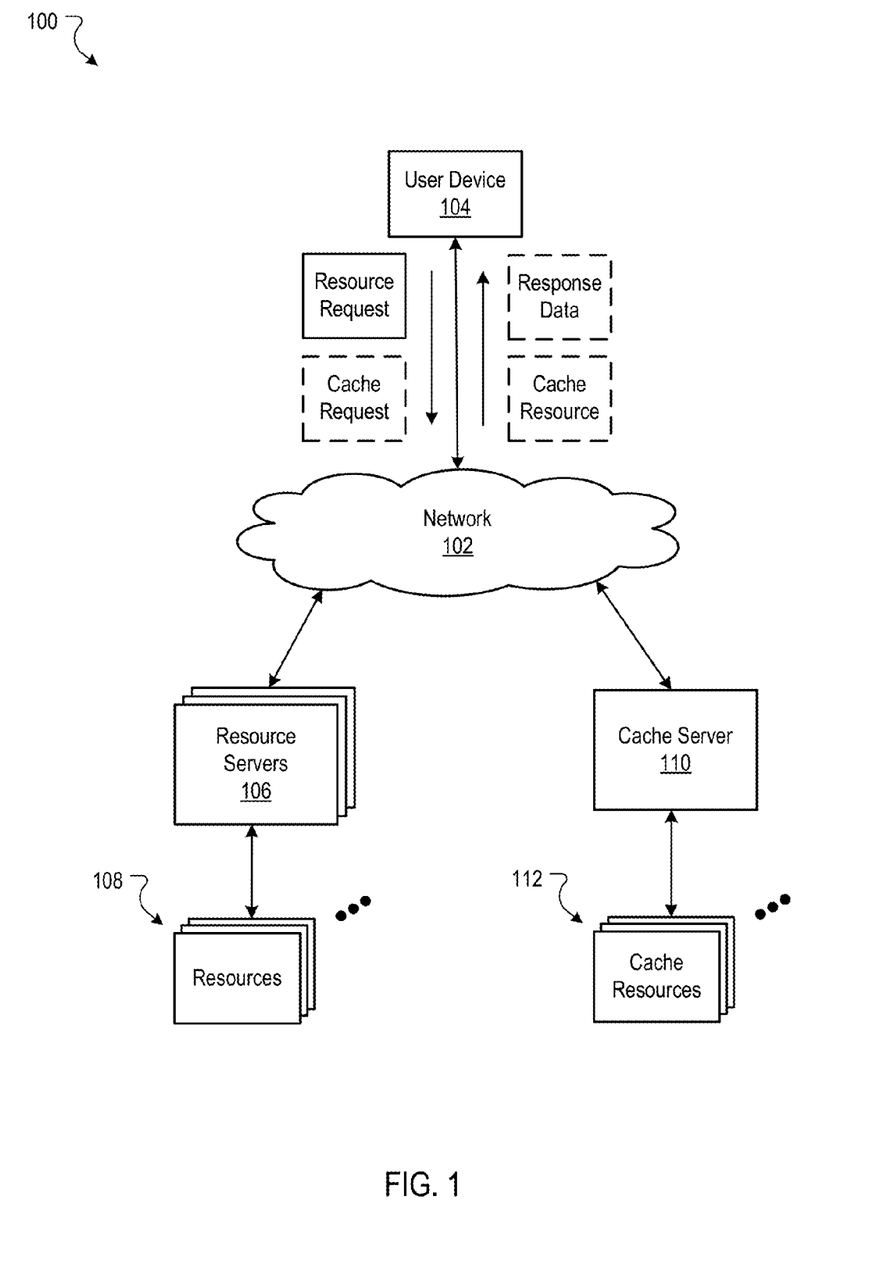
FIG. 1 is a block diagram of an example environment in which cached resources are selectively requested.

FIG. 1 is a block diagram of an example environment 100 in which cached resources are selectively requested. The example environment 100 includes a network 102, such as a local area network (LAN), a wide area network (WAN), the Internet, or a combination thereof. The example environment 100 also includes a user device 104, a resource server 106 that hosts resources 108, and a cache server 110 that hosts cache resources 112.

A resource 108 is data hosted by a resource server 106 and provided over the network 102. A resource 108 is identified by a resource address that is associated with the resource 108. Resources 108 include HTML pages, word processing documents, portable document format (PDF) documents, images, video, and feed sources, to name only a few. The resources 108 can include content, such as words, phrases, images and sounds, that may include embedded information (such as meta-information in hyperlinks) and/or embedded instructions (such as scripts).

A cache server 110 is connected to the network 102, and provides access to cache resources 112. Each cache resource 112 corresponds to a resource 108, and is generally a copy of its corresponding resource 108 that was captured at a particular point in time. In some implementations the cache resource 112 is an HTML-only version of its corresponding resource. In another implementation, the cache resource 112 includes sub-resources, such as JavaScript, CSS, and images. The cache server 110 may periodically refresh the cache resources 112, updating them to more closely reflect the live resources 108. For example, the cache server may update cached versions of resources every hour, or it may update the cached version of a page whenever a change to the live version of the page is detected.

The cache server 110 may, for example, be part of a search engine service, or may be a stand-alone service. The cache resources 112 may, in some implementations, be stored as part of an index, and not stored as actual copies of the resources. Thus, in response to a request, the resource may be "reconstructed" from the index. In other implementations, the resources may be stored in the same form that they are stored in the resource servers 106.

A user device 104 is an electronic device that is under control of a user and is capable of requesting and receiving resources 108 and cache resources 112 over the network 102. Example user devices 104 include personal computers, mobile communication devices, and other devices that can send and receive data over the network 102. A user device 104 typically includes a user application, such as a web browser, to facilitate the sending and receiving of data over the network 102.

When a user device 104 transmits a request for a resource from a first domain, the request includes a resource address. The resource address is, in some implementations, a uniform resource locator (URL), which is a specific character string that constitutes a reference to the resource. An example URL specifies a protocol scheme, a domain name, and a path and name of the resource. The domain name is an identification string that defines a realm of administrative autonomy, authority, or control in the Internet. The request is routed to a host computer (resource server 106) hosting the resource using standard Internet protocols.

The request may be received by a resource server 106 associated with the first domain. If no errors are encountered, the resource server 106 provides the user device 104 with the requested resource. However, one or more errors or conditions may occur that result in the requested resource not being provided to the user device 104. One example error (or intentional condition that is interpreted as an error) is that the resource server identified by the first domain cannot locate the requested resource, e.g., an http 404 error. Another example error is that the user device is unable to communicate with the resource server identified by the first domain after repeated attempts and/or for a certain period of time, e.g., a timeout error.

If the user device 104 does not receive the requested resource or any other response data from a resource server 106, the user device 104 transmits a request for a cached version of the resource to the cache server 110 at a second domain that is different from the first domain. If the user device 104 does receive response data from a resource server, the user device 104 may also transmit a request for a cached version of the resource to the cache server 110 if a cache request condition has occurred. In some implementations, the occurrence of a cache request condition takes into account whether the information received in response to the request is indicative of a publisher's decision to remove a resource or otherwise make the resource unavailable. Cache request conditions are described in more detail with respect to FIG. 2, below.

Upon receipt of a request for a cached version of a resource, the cache server 110 may locate the requested cache resource and provide data that causes its display to the user device 104. The user device 104 receives data that causes it to display the cached version of the resource.

Further detail regarding the operation of the user device 104 is provided in the paragraphs that follow.

Figure 2:
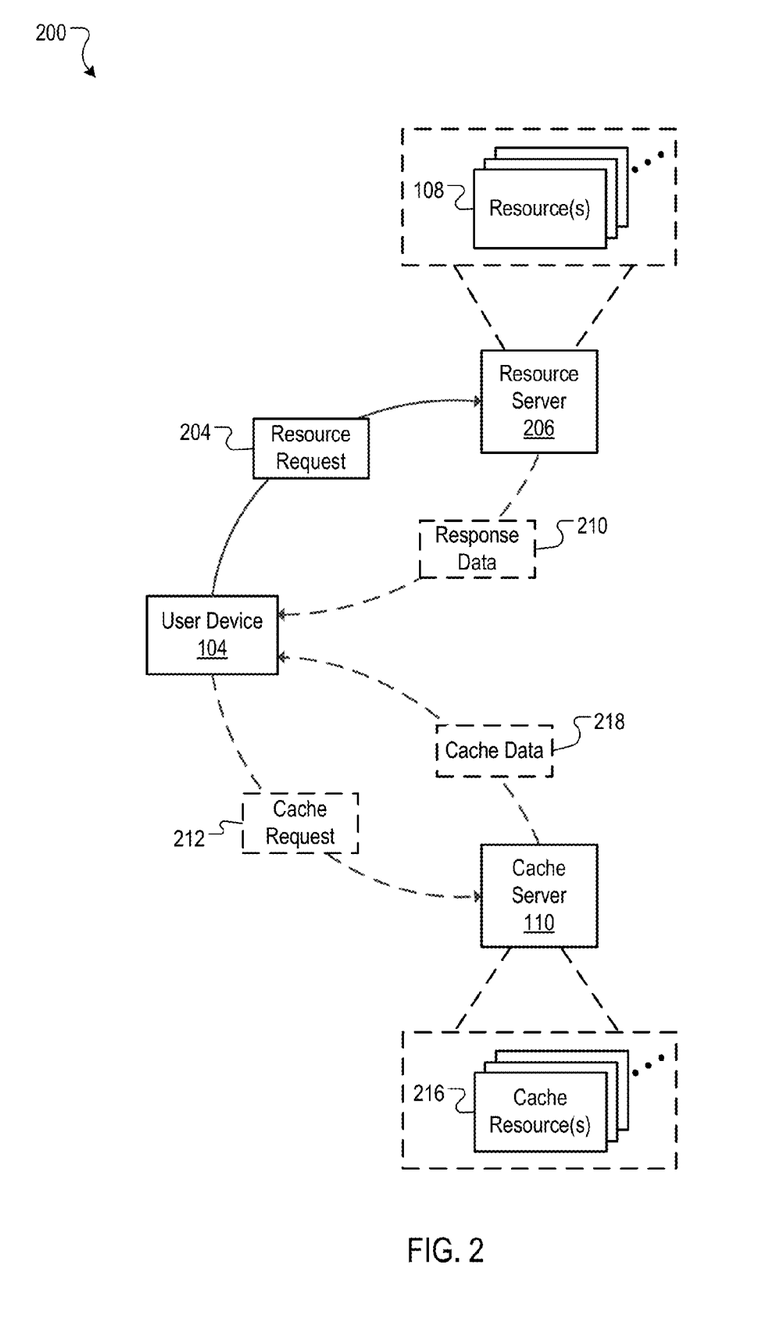
FIG. 2 is an example data flow depicting the selective requesting of a cached version of a resource.

FIG. 2 is an example data flow 200 depicting the selective requesting of a cached version of a resource. A user device 104 transmits a resource request 204 for a resource 108 hosted by a resource server 206 at a first domain. For example, a user may enter a web address, or universal resource locator (URL), into a web browser on the user device 104, or may select a link to the resource, such as a link embedded another web page or search result. The web address, or URL, identifies a domain and the particular web page to be requested. The user device then transmits a request for the web page to the resource server 206 specified by the identified domain.

The user device 104 determines whether the resource server 206 provided response data 210 in response to the resource request 204. Response data is any data received from the resource server 206 in response to the request 204, and includes the requested web page, another web page, or an error message. In some implementations, the user device 104 determines that the resource server 206 did not provide response data 210 in response to an amount of time greater than a timeout threshold having elapsed after the resource request 204 was transmitted. For example, a timeout threshold could be set at 10 seconds, and if the user device 104 does not receive response data 210 within 10 seconds of sending the resource request 204, the user device may determine that the resource server 206 did not provide response data 210.

In some implementations, the user device 104 determines that the resource server 206 did not provide response data 210 in response to determining that the user device 104 was unable to connect to the resource server 206. For example, if the user device 104 could not find or connect to a resource server 206, the user device 104 may determine that the resource server 206 did not provide response data 210. If the user device 104 determines that the resource server 206 did not provide response data, then the user device 104 transmits a cache request 212 for a cached version 216 of the resource to the cache server 110 at the second domain. The processing of the cache request and the response is described in more detail below.

Conversely, if the resource server 206 provided response data 210, the user device 104 determines whether a cache request condition has occurred. In some implementations, the user device 104 determines that a cache request condition occurred in response to determining that the response data 210 comprises a standard http status code indicating that the resource server 206 is not providing the requested resource. Standard http status codes include three digit integer codes that indicate the result of an attempt to understand and satisfy a resource request. Each status code fits into a category, and is associated with a textual description. For example, the category associated with a status code may be informational (e.g., code 1xx), success (e.g., code 2xx), redirection (e.g., code 3xx), client error (e.g., code 4xx), or server error (e.g., code 5xx). The textual description associated with each status code is intended for a human user. For example, the standard text associated with status code "404" is "Not Found," the standard text associated with status code "500" is "Internal Server Error," and the standard text associated with status code "204" is "No Content." Status code "404" is one example of a standard http status code that indicates that the resource server 206 is not providing the requested resource.

In some implementations, the response data that includes a standard http status code that indicates that the resource server 206 is not providing the requested resource may not be customized by a publisher of the requested resource or resource server 206. For example, the response data may cause a web page to be shown that is a standard webpage that corresponds to the standard http status code. An example environment depicting the display of a standard web page corresponding to a standard http status code is described below with respect to FIG. 3, which illustrates an example environment 300 displaying response data for a standard http status code. In some implementations, the example environment 300 may be a web browser of a user device, and the web browser may simply display a standard http status code 310 and its corresponding description 320. For example, if a resource server returns response data indicating a 404 error has occurred, the standard response data may be simply indicate the error, "404," and its corresponding textual descriptions, "not found."

Figure 3:
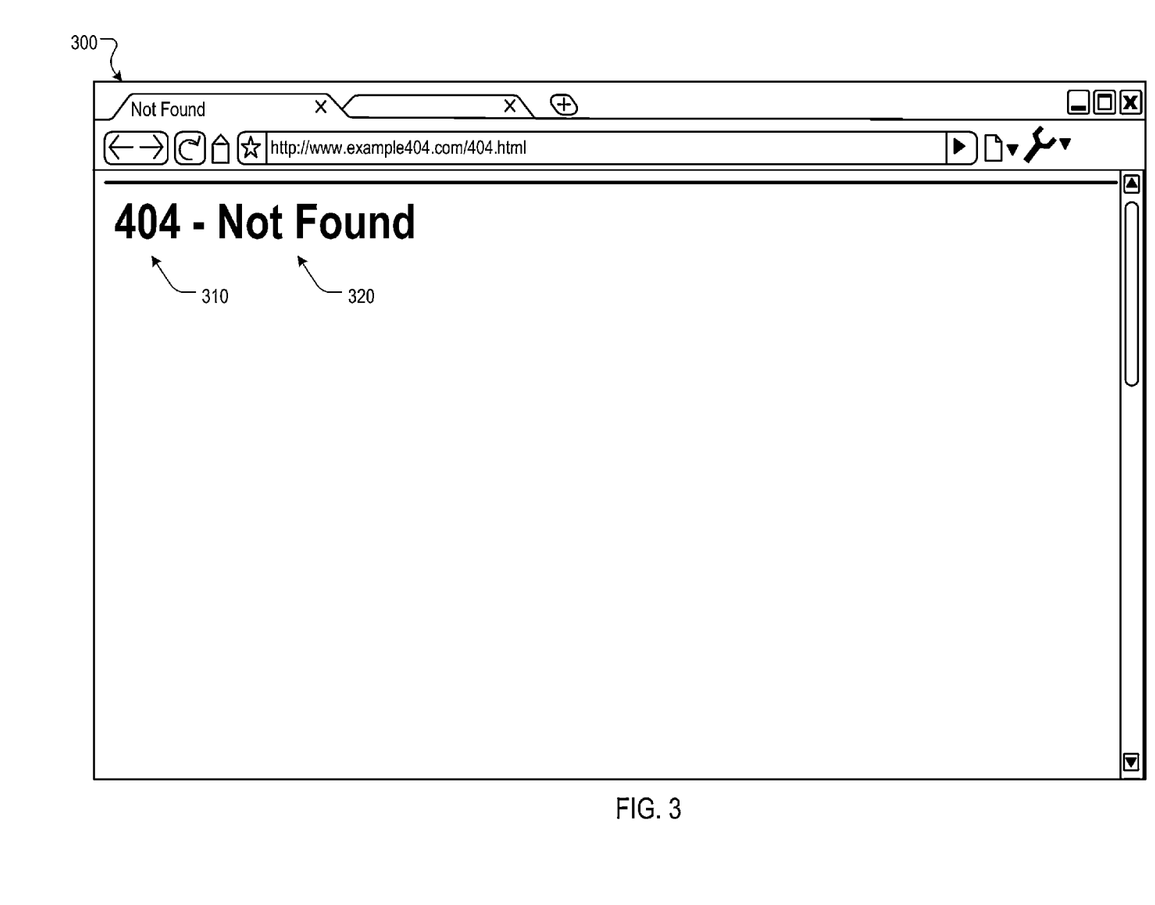
FIG. 3 is an illustration of example environment displaying response data for a standard http status code.

This web page may be provided by the resource server or by a web browser of a user device. Generally, this information is not very helpful for a user, and may be indicative of an unintentional unavailability of the resource (e.g., the publisher may not be aware that the resource is unavailable). In such situations, receipt of the unmodified response data that includes the standard http status code response satisfies a cache request condition.

Figure 4:
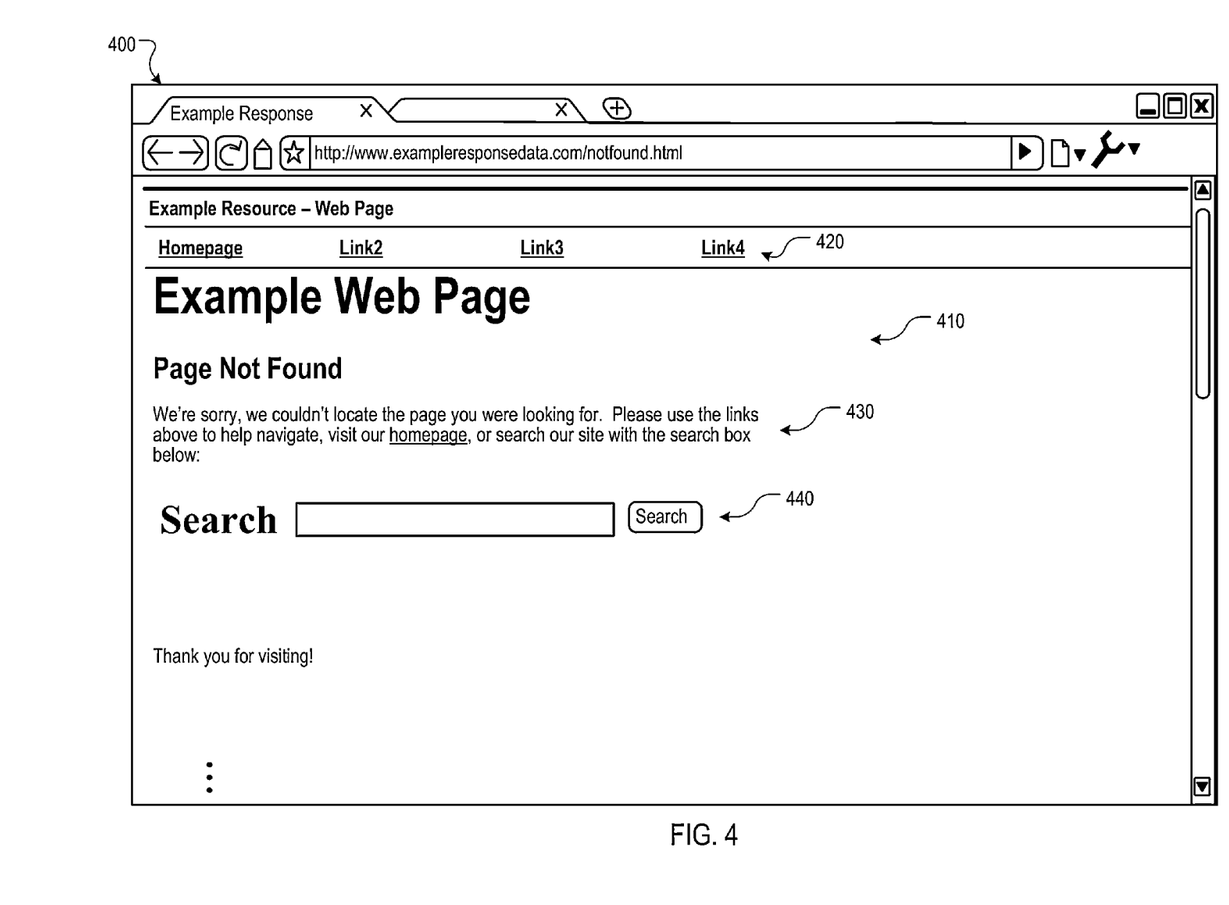
FIG. 4 is an illustration of an example environment displaying customized data specified by response data.

In other situations, publishers controlling resource servers customize their response data. For example, a publisher of a resource can create customized response data that includes the standard http status code and additional data to be provided when the resource server will not provide a requested resource. An example environment depicting the display of a web page corresponding to a customized resource for a standard http status code is shown in FIG. 4, which is an illustration of example environment 400 displaying customized data specified by the response data. For example, the response data may be a customized error page 410 provided by the publisher of the requested resource or the owner/manager of the resource server. A customized error page 410 may include one or more links 420 associated with the resource, textual content 430 that explains the error and/or provides information to the user, or a search element 440 that may be used to search the resource server or the web site provided by the publisher of the customized error page. A customized error page 410 often includes information and/or tools that are useful to a user, and generally provides a better user experience than a standard http status code. Furthermore, the customized error page 410 is indicative of the publisher's intent to no longer make the requested resource available, and may also provide accesses to updated or alternative information that may satisfy the user's informational need.

The customized response data may be more helpful to a user than a standard http status code response or a cached version of the requested resource. For example, when a "404" error is encountered by the resource server 206 (indicating that the server cannot find the requested resource), and the resource server 206 provides a customized error message and search box or suggested alternative site, this may be more beneficial to a user than the standard "404—Not Found" status code, or requesting a cached version of the resource. Accordingly, receipt of response data that includes customized data for a standard http status code response will not satisfy a cache request condition.

In addition to interactions with a particular resource server 106, a user device may also interact with the cache server 110 to determine whether a cache request condition has occurred. For example, the user device 104 can query the cache request server 110 to determine if the lack of availability of the requested resource is an isolated incident or if the resource is not available to multiple other user devices 104. For example, the user device 104 may issue a status request to the cache server 110. The cache server 110 may determine if the resource has been flagged as unavailable by multiple users by looking up the status of the resource in a resource status table or similar data structure that logs cache requests and cache queries. If the cache server 110 determines that the resource is unavailable to a multiple other user devices, such as at least threshold number N, it may communicate this information to the user device 104. Alternatively, the cache server 110 may request the resource, or send its own communication to the resource server (e.g., ping), to determine the availability of the requested resource.

In some implementations, the cache server 110, or a separate part of a search engine service, may determine whether a cache request condition has occurred prior to any communication between the user device 104 and the resource server 206. For example, a user device may communicate with a search engine to locate a particular resource. Upon selection of the resource, or a search result referencing the resource, the search engine may ping the resource server that hosts the selected resource. If the resource is available, the cache request condition has not occurred, and the user device may be provided with data that causes the user device to retrieve the resource from the resource server. If the resource is not available, the cache request condition may have occurred, and the search engine may obtain a cached version of the resource and provide the cached version to the user device.

In response to determining that a cache request condition has occurred, the user device 104 transmits a cache request 212 to the cache server 110. In some implementations, the cache server 110 is located at a second domain that is different from the first domain. For example, the cache server 110 may be separate from the resource server 206. The cache server 110 receives the cache request 212 and locates a cached version of the resource from an index of cache resources 112. Once the cache server 110 locates the cached version of the requested resource, it provides cache data 218 to the user device 104. The cache data 218 causes the user device 104 to display or otherwise access the cached version of the resource. For example, the cache data 218 provided by the cache server 110 may comprise the cached version of the resource, or it may provide a user device with a URL that specifies where the cached resource is hosted and cause the user device to automatically redirect its web browser to the URL.

The user device 104 receives cache data 218 that causes the user device 104 to display the cached version of the resource. In some implementations, instead of receiving the cache data 218, the user device 104 receives a resource locator specifying the location of the cached version of the resource, and the user device 104 can retrieve the cached version from the server identified by the resource locator.

Figure 5:
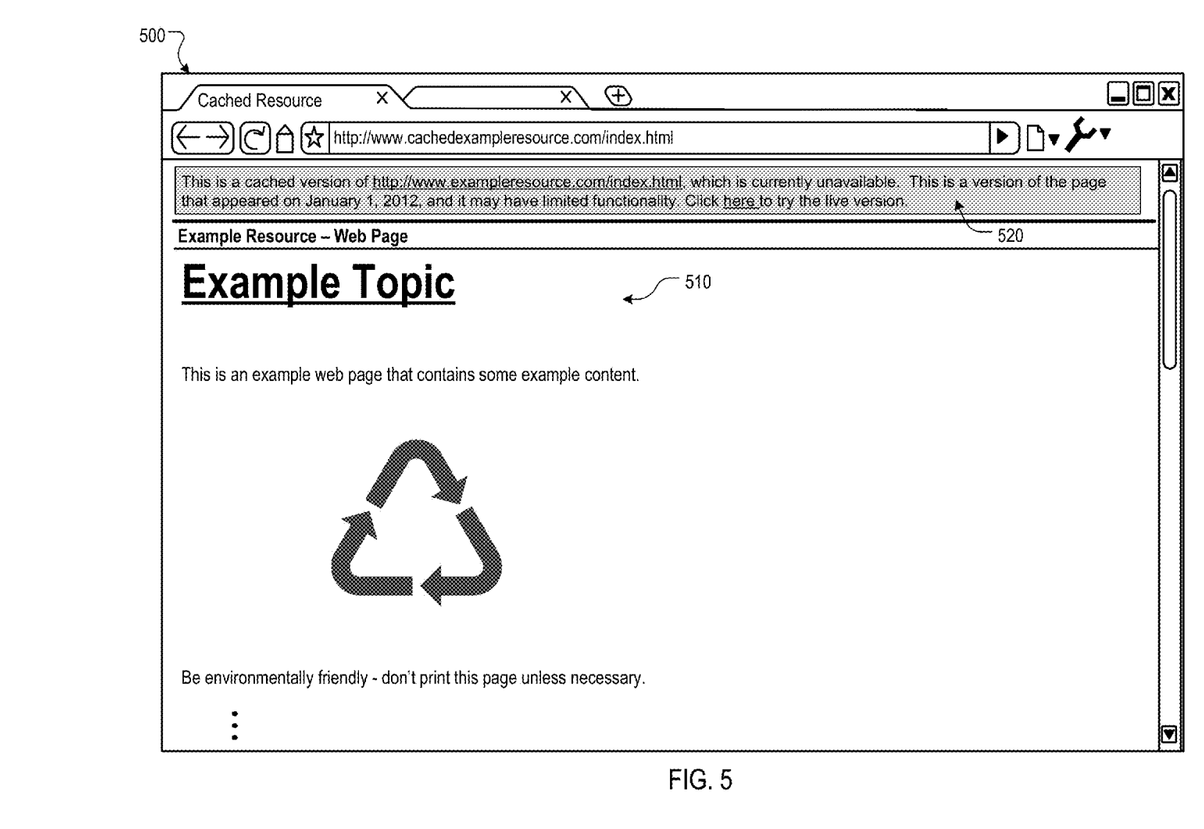
FIG. 5 is an illustration of example environment displaying a cached resource.

In some implementations, the cache data 218 received by the user device 104 causes the user device 104 to display a cache indicator with the cached version of the resource. The cache indicator may specify that the cached version of the resource is being displayed, and may also specify a link to the initially requested resource at the first domain. For example, if the requested resource was identified by the URL: http://www.exampleresource.com/index.html, the cache indicator displayed with a cached version of that resource may provide the user with a message indicating that the user is viewing a cached version, and it may also provide a link to the original resource at http://www.exampleresource.com/index.html. An example environment depicting the display of a cached resource is provided with respect to FIG. 5, which illustrates an example environment 500 depicting the display of a cached resource. The cached version of a resource may be a copy of a web page as it appeared an hour, a day, or a week prior to the current date. In some implementations, the cached version of the resource 510 includes the cache indicator 520 that specifies that a cached version of a resource is being displayed. For example, the cache indicator 520 in the example environment 500 includes text that specifies that the user is viewing a cached version of the requested resource (http://www.exampleresource.com/index.html). The cache indicator 520 also includes a message indicating the date of the cached version, and a link to the live version of the requested resource.

In some implementations, after displaying the cached version of the resource, the user device 104 determines that the requested resource has become available and displays an availability indicator that specifies that the requested resource is available and specifies a link to the requested resource at the first domain. For example, while the cached version of the resource is displayed, a script or some other instruction set running on the user device 104 causes the user device to periodically attempt to communicate with the resource server 206 until the resource server 206 indicates that the requested resource is available, or until the user navigates away from the resource. In other implementations, the user device 104 may periodically attempt to communicate with the cache server 110 or other device that maintains the status of the requested resource until the cache server 110 or other device indicates that the requested resource is available.

For example, when the user device 104 determines that the requested resource has become available, it may display an indicator that specifies that the requested resource hosted by the resource server 206 at the first domain is available. The indicator may also specify a link to the requested resource at the first domain. Given the example resource above, the user device 104 would display an availability indicator that specifies that the resource at http://www.exampleresource.com/index.html is available, and a link to the resource would also be specified by the availability indicator. For example, the cache indictor 520 of FIG. 5 may flash, and the text may be updated to state that the resource is now available.

In some implementations, the user device 104 may navigate to the requested resource upon determining that the requested resource has become available. For example, if a user device 104 is displaying a cached version of a web page when the requested version becomes available, the user device 104 may automatically retrieve the live version from the resource server 206 and display it in addition to—or in place of—the cached version of the resource.

In some implementations, the cache server 110 may store information identifying a user device 104 that requests a cache resource 112 and provide that user device 104 with data specifying that the resource is available if the cache server 110 later determines that the resource is available (e.g., by periodically pinging or requesting the resource from the resource server 206). Alternatively, the cache server 110 may automatically provide the user device the live version of the resource, or provide data to the user device that causes it to automatically request the live version of the resource from the resource server. In some implementations, the cache server 110, or a separate part of a search engine service, may request a resource and a cached version of the resource at the same time. Whether the requested resource or cached version is served to the user device may depend on the availability of the requested resource. For example, a user device may communicate with a search engine to locate a particular resource. Upon selection of the resource, or a search result referencing the resource, the search engine may request the resource from the resource server, and also obtain a cached version of the resource. If the requested resource is available, then the search engine may serve the requested resource to the user device. If the requested resource is not available and/or a threshold period of time has passed and the resource has not been provided, the search engine may provide user device the cached version of the requested resource.

Figure 6:
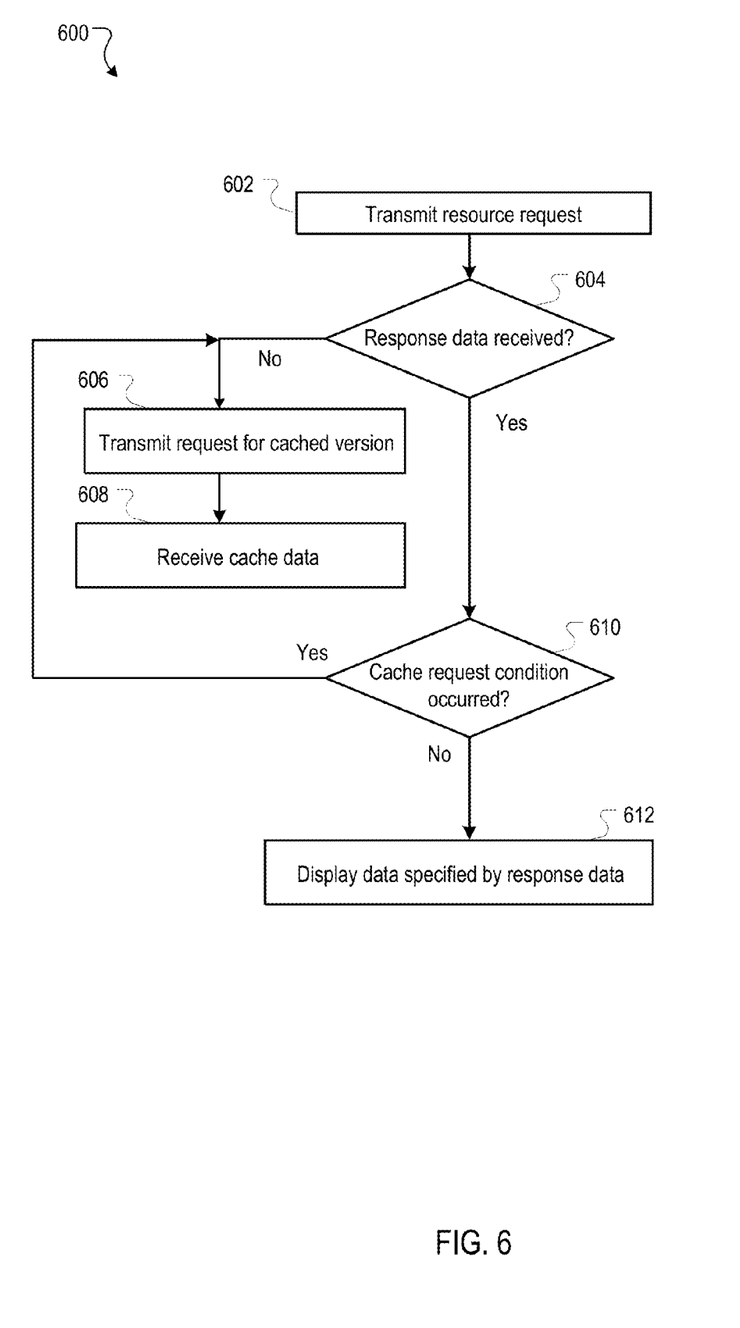
FIG. 6 is a flow diagram of an example process in which cached versions of resources are selectively requested.

FIG. 6 is a flow diagram of an example process 600 in which cached versions of resources are selectively requested. The process may be used by a data processing apparatus such as a user device.

The process 600 transmits a resource request (602). In some implementations the resource request is transmitted by a user device, and the resource request is for a resource hosted by a first server at a first domain. For example, a computer, using a web browser, may send a request for a web page hosted by a first server at a first domain.

The process determines whether response data was received (604). In some implementations, the user device determines whether the first server at the first domain provided response data in response to the resource request. For example, the web browser of the user device may determine if it received http data from the first server at the first domain.

If the process 600 determines that response data was not received, a request for a cached version of the resource is transmitted (606). For example, in response to determining that the first server did not provide response data, the user device transmits a request for a cached version of the resource to a cache server at a second domain. Cache data is received that causes the user device to display the cached version of the resource (608).

If, on the other hand, the process 600 determines that response data was received, the process 600 then determines whether a cache request condition occurred (610). For example, in response to determining that the first server provided response data, the user device determines, based on the response data, whether a cache request condition has occurred. For example, if the requested resource is received, or if a customized resource for an http response error code is received, then the process determines that a cache request condition has not occurred. In response to determining that the cache request condition has not occurred, the data specified by the response data is displayed (612). For example, in response to determining that a cache request condition has not occurred, the user device displays data specified by the response data.

If, on the other hand, the process 600 determines that the cache request condition has occurred, the process transmits a request for a cached version of the resource (606) and cache data is received that causes the user device to display the cached version of the resource (608).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   transmitting, by a user device, a resource request for a resource hosted by a first server at a first domain;
   determining, by the user device, whether the first server at the first domain provided response data in response to the resource request;
   in response to determining that the first server provided response data:
      determining, based on the response data, whether a cache request condition has occurred;
      in response to determining that a cache request condition has occurred:
         transmitting, by the user device, a request for a cached version of the resource to a cache server at a second domain that is different from the first domain and different from the user device, wherein the cached version of the resource comprises a copy of the resource captured at an earlier point in time from the first domain; and
         receiving cache data that causes the user device to display the cached version of the resource and a cache indicator that includes a message specifying that the resource is currently unavailable at the first domain; and
   in response to determining that the first server did not provide response data:
      transmitting, by the user device, a request for a cached version of the resource to the cache server at the second domain, wherein the cached version of the resource comprises a copy of the resource captured at an earlier point in time; and
      receiving cache data that causes the user device to display the cached version of the resource and a cache indicator that includes a message specifying that the resource is currently unavailable at the first domain.

2. The method of claim 1, further comprising:
   in response to determining that a cache request condition has not occurred, displaying data specified by the response data.

3. The method of claim 1, wherein determining whether the first server provided response data comprises determining that the first server did not provide response data in response to an amount of time greater than a timeout threshold having elapsed after transmission of the resource request.

4. The method of claim 1, wherein determining whether the first server provided response data comprises determining that the first server did not provide response data in response to determining, by the user device, that the user device was unable to connect to the first server.

5. The method of claim 1, wherein determining whether a cache request condition occurred comprises determining that the cache request condition occurred in response to determining that the response data comprises a standard http status code indicating that the first server is not providing the requested resource.

6. The method of claim 1, wherein determining whether a cache request condition occurred comprises determining that the requested resource is a resource that is unavailable to a plurality of user devices.

7. The method of claim 1, wherein the cache indicator specifies that the cached version of the resource is being displayed and includes a link to the requested resource at the first domain.

8. The method of claim 1, further comprising:
determining, by the user device, that the requested resource has become available at the first domain; and
displaying an availability indicator on the user device concurrently with the cached version of the resource, the availability indicator specifying that the requested resource is available and specifying a link to the requested resource at the first domain.

9. A system comprising:
a data processing apparatus; and
a data store storing instructions that, when executed by the data processing apparatus, cause the data processing apparatus to perform operations comprising:
transmitting a resource request for a resource hosted by a first server at a first domain;
determining whether the first server at the first domain provided response data in response to the resource request;
in response to determining that the first server provided response data:
determining, based on the response data, whether a cache request condition has occurred;
in response to determining that a cache request condition has occurred:
transmitting a request for a cached version of the resource to a cache server at a second domain that is different from the first domain and different from the user device, wherein the cached version of the resource comprises a copy of the resource captured at an earlier point in time from the first domain; and
receiving cache data that causes a user device to display the cached version of the resource and a cache indicator that includes a message specifying that the resource is currently unavailable at the first domain; and
in response to determining that the first server did not provide response data:
transmitting a request for a cached version of the resource to the cache server at the second domain, wherein the cached version of the resource comprises a copy of the resource captured at an earlier point in time; and
receiving cache data that causes a user device to display of the cached version of the resource and a cache indicator that includes a message specifying that the resource is currently unavailable at the first domain.

10. The system of claim 9, wherein the operations further comprise:
in response to determining that a cache request condition has not occurred, causing a user device to display data specified by the response data.

11. The system of claim 9, wherein determining whether the first server provided response data comprises determining that the first server did not provide response data in response to an amount of time greater than a timeout threshold having elapsed after transmission of the resource request.

12. The system of claim 9, wherein determining whether the first server provided response data comprises determining that the first server did not provide response data in response to determining that a user device was unable to connect to the first server.

13. The system of claim 9, wherein determining whether a cache request condition occurred comprises determining that the cache request condition occurred in response to determining that the response data comprises a standard http status code indicating that the first server is not providing the requested resource.

14. The system of claim 9, wherein determining whether a cache request condition occurred comprises determining that the requested resource is a resource that is unavailable to a plurality of user devices.

15. The system of claim 9, wherein the cache indicator specifies that the cached version of the resource is being displayed and includes a link to the requested resource at the first domain.

16. The system of claim 9, wherein the operations further comprise:
determining that the requested resource has become available at the first domain; and
displaying an availability indicator on a user device concurrently with the cached version of the resource, the availability indicator specifying that the requested resource is available and specifying a link to the requested resource at the first domain.

17. A non-transitory computer readable medium including instructions that, when executed by a data processing apparatus, cause the data processing apparatus to perform operations comprising:
transmitting a resource request for a resource hosted by a first server at a first domain;
determining whether the first server at the first domain provided response data in response to the resource request;
in response to determining that the first server provided response data:
determining, based on the response data, whether a cache request condition has occurred;
in response to determining that a cache request condition has occurred:
transmitting a request for a cached version of the resource to a cache server at a second domain that is different from the first domain and different from the user device, wherein the cached version of the resource comprises a copy of the resource captured at an earlier point in time from the first domain; and
receiving cache data that causes a user device to display the cached version of the resource and a cache indicator that includes a message specifying that the resource is currently unavailable at the first domain; and in response to determining that the first server did not provide response data:
- transmitting a request for a cached version of the resource to the cache server at the second domain, wherein the cached version of the resource comprises a copy of the resource captured at an earlier point in time; and
- receiving cache data that causes a user device to display of the cached version of the resource and a cache indicator that includes a message specifying that the resource is currently unavailable at the first domain.

18. The non-transitory computer readable medium of claim 17, wherein the operations further comprise:
in response to determining that a cache request condition has not occurred, causing a user device to display data specified by the response data.

19. The non-transitory computer readable medium of claim 17, wherein determining whether a cache request condition occurred comprises determining that the cache request condition occurred in response to determining that the response data comprises a standard http status code indicating that the first server is not providing the requested resource.

20. The non-transitory computer readable medium of claim 17, wherein the operations further comprise:
- determining that the requested resource has become available at the first domain; and
- displaying an availability indicator on a user device concurrently with the cached version of the resource, the availability indicator specifying that the requested resource is available and specifying a link to the requested resource at the first domain.

* * * * *